No. 816,006. PATENTED MAR. 27, 1906.
C. E. DURYEA.
TIRE VALVE.
APPLICATION FILED APR. 3, 1905.
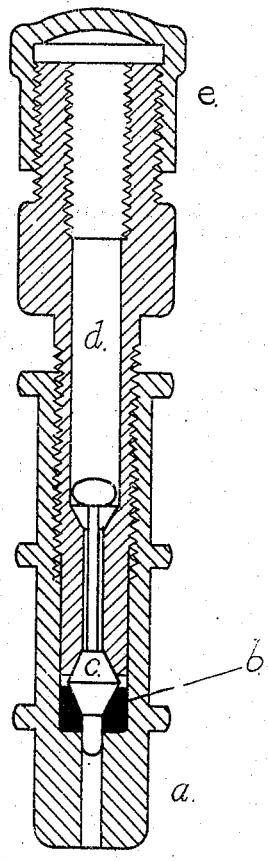

UNITED STATES PATENT OFFICE.

CHARLES E. DURYEA, OF READING, PENNSYLVANIA.

TIRE-VALVE.

No. 816,006.　　　Specification of Letters Patent.　　　Patented March 27, 1906.

Application filed April 3, 1905. Serial No. 253,679.

*To all whom it may concern:*

Be it known that I, CHARLES E. DURYEA, a citizen of the United States, residing at Reading, in the county of Berks and State of Pennsylvania, have invented certain new and useful Improvements in Tire-Valves for Pneumatic Tires and other Inflated Articles; and I do hereby declare the following to be a full, clear, and exact description of the invention, such as will enable others skilled in the art to which it appertains to make and use the same.

My invention relates to improvements in valves for pneumatic tires for vehicles and similar articles requiring inflation.

The objects of this invention are to produce a valve that will admit air to the inflated article with the least possible friction and unnecessary pressure, that will hold it securely and with certainty after inflation, that will permit it to be deflated readily, and that has no delicate or perishable parts liable to clog, swell, stick, wear out, or otherwise deteriorate. These objects are accomplished by the use of the mechanism shown in the accompanying drawing, forming part of this specification, in which—

*a* represents the valve-body; *b*, the gasket or valve-seat; *c*, the check or valve proper; *d*, the check-holder, and *e*, the cap. These parts are shown in section with the exception of the check *c*.

The valve-body *a* is of any usual or preferred construction so far as the outer surface of the lower end is concerned. It is provided with an air-passage through it in the usual manner, and the upper end of this air-passage is enlarged. A screw-thread is provided near the outer end of the enlarged portion, and the gasket or valve-seat *b* is placed at the bottom end. This gasket is of a material soft enough to form a suitable packing, but not so soft as to forge readily or change its shape easily. A number of materials can be used for this purpose—such as lead, copper, hard rubber, vulcanized fiber, and soft or slightly flexible vulcanite. Since any material soft enough to form a perfect gasket will under time and pressure forge to some extent the check *c*, which is forced against this gasket to make a tight closure, is so shaped as to force the gasket more firmly against its seat and to prevent any movement of the material of the gasket that might prevent a free passage of the air during inflation. This result is secured by providing the check *c* with a conical bearing-surface and with a point or guide approximately cylindrical long enough to project through the gasket and of a diameter substantially corresponding to the air-passage through the valve-body. This check is further provided with a surface on its upper side adapted to take a bearing on the end of the check-holder *d*, and a small stem is also provided, which passes through the lower end of the check-holder and terminates in a large flat head in the enlarged passage in the upper end of the check-holder. This head is flattened in a plane passing through the stem of the check, and while serving to attach the check to the holder it does not in any way interfere with the passage of the air through the central opening of the holder. In construction it is customary to make the check and its stem in two parts, the check having a small hole passing through it large enough to receive the stem and united after the stem is placed in the holder by soft-soldering. It is particularly to be desired that the bearing-surface of the check be true and smooth and hard enough to remain so. This insures that the seat is not damaged or distorted by any roughness or irregularity of the valve-check. The check-holder is slightly enlarged above the valve-body and preferably knurled to provide a means for manipulating. Of course flat sides to receive a wrench or any similar arrangement may be used. The extreme upper end of the check-holder is threaded outside and inside to receive the hose connections of the two sizes most commonly used. Of course these threads may be of any preferred sizes. The cap is provided to keep out dirt and to add a finished appearance. It is in no wise necessary to the operation of the valve, does not contribute to holding the air, and causes no inconvenience if lost.

The operation of the valve is as follows: The check-holder is unscrewed from the valve-body until the flattened head of the check is engaged by the lower end of the large passage through the check-holder. Further unscrewing lifts the check away from its seat until the cylindrical point of the check no longer obstructs the passage. The cap is then removed and the hose attached. A clear passage now exists, permitting a free flow of air unobstructed by any springs or checks that must be lifted by the air requiring increased pressure or any of the usual objectionable features excepting, of course, the slight friction of the air on the passages, which is greatly reduced by making these passages larger than is common. If the flow of air is intermittent, as when a hand-pump is used, the check and its stem being light and free to move is blown upward against the end of the check-holder and serves as a check-valve to prevent any perceptible escape of air. Since this check has no packings or soft-rubber parts, its movement is quite free in either direction, and no springs are needed, while all resistance to pumping is avoided. This feature is of decided importance when the operator is engaged in pumping a large autotire with an ordinary pump in hot weather, for it saves a large amount of the labor. During the pumping the joint formed between the threads of the check-holder and the threads in the outer end of the valve-body is exposed to the air-pressure; but since these threads are long very little escape is possible, and this escape only continues during the time that the check is free from its seat. A packing could be provided; but experience indicates that this is not necessary, particularly if the threads are coated with common soap or some similar substance. When inflation is completed, the check-holder $d$ is screwed downward, forcing the check $c$ firmly upon its seat. This not only holds the seat or gasket tightly in place, but causes it to make a tight joint with the check and closes the opening in the most effectual manner. Since the seat cannot change its shape in a manner tending to close the opening, it follows that the valve remains in good order and is ready for use at any time. If perchance the seat should stick to the check, unscrewing of the holder will withdraw both check and seat and permit immediate repair. When withdrawn, ordinarily the seat or gasket remains in place while the check is attached to the holder, thus leaving no parts liable to be lost or damaged. The stem of the check performs no function except to withdraw the check and even if bent accidentally to a greater or less extent does not interfere with the proper action of the valve. While this stem is preferably formed as described, other constructions and methods of attachment to the check may be used.

I claim—

A valve-body having an air-passage therethrough with its outer end enlarged, forming an interior shoulder, the outer portion of said passage being interiorly threaded, a valve-seat resting on said shoulder and having passage therethrough, a check-holder having exterior threads engaging the interior threads of the body, and having a passage in line with the passage in the inner end of said body, and an enlarged passage outward therefrom, a check having a double conical body with stem depending through the valve-seat into the air-passage in the inner end of the body beyond said shoulder and a stem extended in the opposite direction into the enlarged bore of the check and having a head movable therein and closing the communication between the large and small bore of the check, and a cap detachably secured to the outer end of said check-holder.

In testimony whereof I affix my signature in presence of two witnesses.

CHARLES E. DURYEA.

Witnesses:
 E. A. RUTH,
 B. E. BATES.